Patented Jan. 19, 1943

2,308,711

UNITED STATES PATENT OFFICE 2,308,711

CONDITIONING ANTHRAQUINONE VAT DYESTUFFS

Grady M. O'Neal, Chicago, Ill., assignor to The Sherwin-Williams Company, Cleveland, Ohio, a corporation of Ohio No Drawing. Application April 16, 1941,
Serial No. 388,791

19 Claims. (Cl. 260—369)

The present invention relates to dyestuffs, and more particularly to anthraquinone vat dyestuffs where pigmentary properties are important and desired.

It is well known that vat dyestuffs of this type, as obtained in the final crude condition, generally possess extremely poor tinctorial properties because of their unfavorable physical condition. This is due to a coarseness or agglomeration of the dyestuff particles, which in turn results in the pigmentary properties, such as brightness of hue, color strength, and masstone characteristics, being highly undesirable or unsuited for uses in printing, paint manufacture, or in other common and usual practices. This unsuitability of physical state, experience has shown, can not be satisfactorily changed by mere mechanical means, as by a diminution of particle size by grinding.

Numerous attempts have been made to enhance the pigmentary properties of anthraquinone vat dyestuffs. In general, these efforts may be broadly classed into three types: the crude dyestuff is reduced to the leuko form and then reoxidized to the insoluble form, the vat color is conditioned by an acid pasting, or the improved physical state is obtained as a result of treatment with a material or materials. U. S. Patent No. 2,091,102 is a typical example of the first classification, U. S. Patent No. 2,065,928 of the second, and British Patent No. 503,666 of the third, the improvements in the latter instance being secured by physically admixing the dyestuff with various organic "swelling agents" such as alcohols, acids, and halogen-containing hydrocarbons.

All of the processes in use or offered for use have objections. In some instances they are specific with respect to a particular dyestuff, in others, very little improvement, or by no means the known possible tinctorial properties, are obtained, or, once the desired physical condition is secured, it is difficult to remove the agent that results in this improved physical state.

An object of the present invention is to produce anthraquinone vat dyestuffs in a form suitable for pigment use so that one or all of the pigment properties, high tinctorial strength, improved masstone, clarity of hue, and softness of particle are secured, thus enabling these pigments to be employed to new advantage in paints, enamels, lacquers, inks, plastics, and other general and well known uses.

Another object of the invention is to effect these pigment improvements by means that lend themselves to simplicity and ease of operation.

Still another object of the invention is to utilize, as agents for securing these improved pigment dyestuffs, materials that are readily obtainable.

Various other and ancillary objects and advantages of the invention will appear from the following description and explanation.

These objects are accomplished by admixing an anthraquinone vat dyestuff with a liquid aromatic amine which has the aniline nucleus, and then separating the diluent mass into its component parts, whereby a desirable pigment form results.

The invention contemplates that the dyestuff form be converted to the pigment form, and also that the pigment form be arrived at by applying the present invention as a step in the manufacture of anthraquinone vat dyestuffs. At a suitable stage in the process, the dyestuff material, either as a dry powder, or as a wet cake, or as a paste, is thoroughly mixed with a liquid form of aniline or a substituted aniline, which incidentally is not at all or is but slightly soluble in water. Preferably, one is used which is liquid at normal temperatures, whereby no heat is required in the mixing operation. Where a solid amine may be liquefied by melting, a temperature to effect melting may be employed in the mixing. This is not the ideal procedure, however, in that, while the results parallel closely the normal temperature operation, the processing step is rendered somewhat more complex.

It has been discovered that materials coming under the classification of liquid aromatic amines and accomplishing the aims and enumerated objects of this invention may be found within the compounds represented by the formula

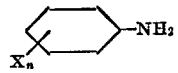

where X is selected from the group consisting of hydrogen, halogen, alkyl and alkoxy, and where $n$ represents 1 or 2 substituents X in the ring, X being permissibly different where it occurs more than once. X may be other than those listed, as for example, o-amino-benzaldehyde, and X may occur more than 2 times. Many of the derivatives of aniline are normally solid and require heat, where the liquid form is to be used.

The removal of the amine may be effected generally in a number of ways, all of which apply to the normally liquid amines, and at least one of which applies to normally solid amines. The amine may be converted to a water-soluble salt and removed in water solution. Thus, aniline may be converted to aniline hydrochloride, or aniline sulfate, and extracted by water. Another way is to steam distill with wet, dry or superheated steam, at normal or sub-atmospheric pressure, according to the steam distillability of the amine. Still another way is to extract the amine with a solvent, preferably a volatile organic solvent. Within the broad designation of solvent, water is contemplated for such amines as have a water-solubility, such as aniline, which to a degree, will dissolve in water.

While all of these methods of removing the amine are satisfactory and have given products of excellent quality, the factors of economy and ease of operation are the prime determinant as to the selection of the procedure. The preferred method of removing the amine is by forming a water-soluble amine-salt.

The relative amounts of amine and of dyestuff are not critical and may vary. Excess amine does not harm, but is economically wasteful. The presence or absence of water does not affect the result. Decreased quantities of amine affect the result, and accordingly a lower limit is indicated. The desired objectives begin to manifest themselves where at least 1 part by weight of amine is used for 10 parts by weight of color (dry basis). Entirely satisfactory results have been obtained where 300 parts of amine have been used to 10 parts of color (dry basis), but this large amount is rarely if ever necessary.

The method of mixing is not important, and may vary from simple stirring of fluid masses to masticating mixing of thick masses, either method being conducted with or without a simultaneous grinding or mechanical subdivision. The aim is to produce uniform mixture in order to have all the color impregnated with liquid amine.

The time of contact for arriving at the highest pigment improvement is not fixed and can vary over a wide range, depending upon the manner of producing the dyestuff-liquid amine admixture. Where there is a mechanical sub-division, as in ball-mill operations, a shorter contact period is possible than by the mixing method. Highly satisfactory results have been obtained by a ball-mill grinding period of 30 minutes. Prolonged dyestuff-liquid amine admixing, beyond a certain point, does not effect further improvements. Hence, the admixture period is flexible and is usually determined by the nature and efficacy of the processing equipment.

In the manufacture of anthraquinone vat dyestuffs, acid pasting is often used in conditioning the crude color for dyestuff usage. The present invention may be used as an adjunct to an acid pasting, in certain instances, to great advantage, and by such use provides a process additive to normal dyestuff manufacturing.

The invention is illustrated below by numerous examples; wherein, parts are by weight.

*Example 1*

200 parts of crude Indanthrene Blue RS (Schultz, "Farbstofftabellen," 7th edition, 1931, page 546, No. 1228, or Colour Index, 1922, page 266, No. 1106, scientifically designated as N-dihydro-1:2:1':2'-anthraquinone-azine), in the form of wet press-cake, in its oxidized form, are placed in a Baker-Perkins mixer with 200 parts of aniline, and mixed for 4 hours. The mass is then removed to a suitable vessel, and 20,200 parts of 2.25% hydrochloric acid solution in water are added so as to form aniline hydrochloride. A half an hour of slurrying is allowed for thorough action, and then the mass is heated at the boiling temperature for 5 minutes, filtered, and washed free from acid. The product is dried and ground. The dyestuff is useful as a pigment, possessing excellent color strength, a desirable brightness and cleanliness of shade, and darkness of masstone. It is redder in shade than the same crude color which has been acid-treated, as set forth in Example 2.

*Example 2*

200 parts of crude Indanthrene Blue RS (see Example 1), as obtained from the caustic fusion of 2-amino-anthraquinone, and in a dry and finely divided state, are gradually added to 2,208 parts of 98% to 100% sulfuric acid at room temperature with agitation. After one hour or more to effect complete solution, the mass is slowly run into well agitated ice-water composed of 2,000 parts of water and 2,000 parts of crushed ice, the temperature being maintained throughout at 0° to 5° C. by the addition of more ice, as required. The acid slurry is then filtered and washed free from acid, leaving a wet filter cake.

The wet filter cake and 102 parts of aniline in a Baker-Perkins mixer are agitated for 4 hours. Then the mass is added to 10,350 parts of 2.25% hydrochloric acid solution in water, and after stirring to a smooth slurry, boiled for 5 minutes. A filtration and washing free from acid is effected, and the product is then dried and ground to form a useful pigment, like that of Example 1.

The obtained dyestuff is cleaner and brighter in shade than the product of Example 1, and has a much greener hue. It possesses a bright dark masstone, and exhibits tinctorial strength of a high order.

As an alternative procedure in the removal of the amine, the sulfuric acid filtrate in whole or in part may be employed to form aniline sulfate, in place of using all hydrochloric acid to form aniline hydrochloride.

*Example 3*

Indanthrene Blue RS filter cake as provided by the acid treatment of Example 2, in amount to provide 10 parts of color (dry basis), are placed in a suitably-sized ball mill, with steel balls, 15 parts of ortho-toluidine are added, and the mass ground for 6 hours. The mixture is then added to 500 parts of water and 61 parts of 28% hydrochloric acid solution, well slurried, and boiled for 5 minutes. Filter and wash free from acid.

The product may be dried and ground to form a dry pigment, or employed in known manner as a paste. Pigment dyestuff properties are substantially identical with that of Example 2.

*Example 4*

Meta-toluidine is substituted for the ortho-toluidine in Example 3, with almost identical results.

*Example 5*

The technical grade of mixed toluidines, comprising the ortho, meta, and para, is used in place of the orthotoluidine of Example 3. The obtained product is substantially that resulting from the processing of Example 3.

Example 6

The technical grade of mixed xylidines is employed in place of ortho-toluidine of Example 3. Almost identical results obtain.

Example 7

In Example 3, the 15 parts of ortho-toluidine are replaced by 18 parts of meta-chloraniline. The product of Example 3 is duplicated quite closely.

Example 8

In Example 3, the 15 parts of ortho-toluidine are replaced by 15 parts of para-tertiary-butyl-aniline. The resulting dyestuff form resembles that of Example 3.

Example 9

In Example 3, the 15 parts of ortho-toluidine are replaced by 15 parts of 2-amino-4-chlorotoluene. A dyestuff form of excellent pigmentary properties, and very similar to that of Example 3 results.

Example 10

In Example 3, the 15 parts of ortho-toluidine are replaced by 15 parts of ortho-anisidine, and the pigment so obtained, after this processing, is substantially as that of Example 3.

Example 11

10 parts of crude Indanthrene Yellow G (Schultz, "Farbstofftabellen," 7th edition, page 554, No. 1241, or said Colour Index, page 268, No. 1118, scientifically designated as flavanthrone), as a dry powder, are added to 110 parts of 98 to 100% sulfuric acid at room temperature, and stirred for one hour, or longer, until complete solution results. This is then run with good agitation into ice water consisting of 250 parts of water and 250 parts of crushed ice, maintaining the dilution temperature throughout at 0° to 5° C., by the addition of more ice, as necessary. Then stir well, filter, and wash free from acid. The product may be dried and ground.

As the dry powder, or as filter cake before such drying, the mass is added to 200 parts of aniline and mixed well for 4 hours. The general procedure of Example 1 may be followed to remove the aniline as the hydrochloride salt. The aniline may then be recovered in known manner.

The obtained pigment dyestuff exhibits a darkened mass-tone and a considerable step-up in color strength.

Example 12

Indanthrene Red BN (said Schultz, page 563, No. 1258, or said Colour Index, page 277, No. 1162, scientifically designated as 1:2-anthraquinone-naphacridone), is conditioned by the procedure of Example 11.

The dyestuff resulting from this conditioning possesses a lighter and brighter masstone, is of a yellower shade, and exhibits increased tinctorial strength.

An alternative method more useful in the case of using large amounts of a steam distillable amine, is to filter off any filterable amine to provide a cake. The resulting amine-containing cake is then suspended in water and steam passed through it, to steam distill the residual amine, leaving a water suspension of the dye. Also the amine-containing cake may be extracted with a solvent for the amine.

The substituents in the aniline nucleus are not chemically reactive, and are of significance only as they control the liquid form of the amine at a given temperature. Since the invention may be practiced at elevated temperatures, amines may be used which are other than those given as defining some amines that are liquid at normal temperature. It is the fluidity of the amine, rather than its chemical properties resulting from substituents, that is essential to effect a homogeneous mixture of the amine and the solid color.

The invention may be carried out in numerous ways in modification of the specific examples selected to illustrate and explain the invention, without departing from the spirit and scope of the invention as set forth in the appended claims.

I claim:

1. The method of producing a pigment-form of a pigmentary anthraquinone vat dyestuff, which comprises mixing the solid dyestuff with a liquid mononuclear aromatic amine of the benzene series to secure a homogeneous mixture including said color and said amine, and then removing the amine from the mixture, whereby the physical form of the resulting solid is suitable for pigment use.

2. The method of producing a pigment-form of a pigmentary anthraquinone vat dyestuff, which comprises mixing the solid dry dyestuff with a liquid mononuclear aromatic amine of the benzene series to secure a homogeneous mixture including said color and said amine, and then removing the amine from the mixture, whereby the physical form of the resulting solid is suitable for pigment use.

3. The method of producing a pigment-form of a pigmentary anthraquinone vat dyestuff, which comprises mixing the solid wet dyestuff with a liquid mononuclear aromatic amine of the benzene series to secure a homogeneous mixture including said color and said amine, and then removing the amine from the mixture, whereby the physical form of the resulting solid is suitable for pigment use.

4. The method of producing a pigment-form of a pigmentary anthraquinone vat dyestuff, which comprises mixing the solid dyestuff with a mononuclear aromatic amine of the benzene series, which amine is a liquid at normal temperature to secure a homogeneous mixture including said color and said amine, and then removing the amine from the mixture, whereby the physical form of the resulting solid is suitable for pigment use.

5. The method of producing a pigment-form of a pigmentary anthraquinone vat dyestuff, which comprises mixing the solid dyestuff with a liquid mononuclear aromatic amine of the benzene series to secure a homogeneous mixture including said color and said amine, adding water and acid to form a water-soluble amine salt, and separating the solid color from the resulting solution of the amine salt.

6. The method of producing a pigment-form of a pigmentary anthraquinone vat dyestuff, which comprises mixing the solid dyestuff with a liquid mononuclear aromatic amine of the benzene series to secure a homogeneous mixture including said color and said amine, and steam-distilling amine from the solid color.

7. The method of producing a pigment-form of a pigmentary anthraquinone vat dyestuff, which comprises mixing the solid dyestuff with a liquid mononuclear aromatic amine of the benzene series to secure a homogeneous mixture including said color and said amine, and extracting amine from the solid color by a solvent for amine which is non-solvent for the color.

8. The method of producing a pigment-form of a pigmentary anthraquinone vat dyestuff, which comprises mixing the solid dyestuff with a mononuclear aromatic amine of the benzene series, which amine is a liquid at normal temperature to secure a homogeneous mixture including said color and said amine, adding water and acid to form a water-soluble amine salt, and separating the solid color from the resulting solution of the amine salt.

9. The method of producing a pigment-form of a pigmentary anthraquinone vat dyestuff, which comprises mixing the solid dyestuff with a mononuclear aromatic amine of the benzene series, which amine is a liquid at normal temperature to secure a homogeneous mixture including said color and said amine, and steam-distilling amine from the solid color.

10. The method of producing a pigment-form of a pigmentary anthraquinone vat dyestuff, which comprises mixing the solid dyestuff with a mononuclear aromatic amine of the benzene series, which amine is a liquid at normal temperature to secure a homogeneous mixture including said color and said amine, and extracting amine from the solid color by a solvent for amine which is non-solvent for the color.

11. In the manufacture of anthraquinone vat dyestuffs, the steps of adding the crude manufactured color as a dry powder to concentrated sulfuric acid, pouring the mixture into ice water, separating the solid color from acid solution, thoroughly mixing the solid color with a liquid mononuclear aromatic amine of the benzene series, and removing the amine from the solid color, whereby the physical form and properties of the resulting solid are suitable for use as a pigment.

12. The method of producing a pigment-form of a pigmentary anthraquinone vat dyestuff, which comprises mixing the solid dyestuff with aniline to secure a homogeneous mixture including said color and said aniline, and then removing the aniline from the mixture, whereby the physical form of the resulting solid is suitable for pigment use.

13. The method of producing a pigment-form of a pigmentary anthraquinone vat dyestuff, which comprises mixing the solid dyestuff with aniline to secure a homogeneous mixture including said color and said aniline, then adding water and an acid to form a water-solution of a resulting aniline salt, and separating the said solution from the resulting solid dyestuff, whereby the latter has a physical form suitable for pigment use.

14. The method of producing a pigment-form of a pigmentary anthraquinone vat dyestuff, which comprises mixing the solid dyestuff with aniline to secure a homogeneous mixture including said color and said aniline, there being at least 1 part by weight of aniline to 10 parts by weight of dyestuff, and then removing the aniline from the mixture, whereby the physical form of the resulting solid is suitable for pigmentary use.

15. The method of producing a pigment-form of a pigmentary anthraquinone vat dyestuff, which comprises mixing the solid dyestuff with a liquid mononuclear aromatic amine of the benzene series, there being at least 1 part by weight of amine to 10 parts by weight of dyestuff, and then removing the amine from the mixture, whereby the physical form of the resulting solid is suitable for pigmentary use.

16. The method of producing a pigment-form of a pigmentary anthraquinone vat dyestuff, which comprises mixing the solid dyestuff with toluidine to secure a homogeneous mixture including said color and said toluidine, and then removing the toluidine from the mixture, whereby the physical form of the resulting solid is suitable for pigment use.

17. The method of producing a pigment-form of a pigmentary anthraquinone vat dyestuff, which comprises mixing the solid dyestuff with toluidine to secure a homogeneous mixture including said color and said toluidine, there being at least 1 part by weight of toluidine to 10 parts by weight of dyestuff, and then removing the toluidine from the mixture, whereby the physical form of the resulting solid is suitable for pigmentary use.

18. The method of producing a pigment-form of a pigmentary anthraquinone vat dyestuff, which comprises mixing the solid dyestuff with xylidine to secure a homogeneous mixture including said color and said xylidine, and then removing the xylidine from the mixture, whereby the physical form of the resulting solid is suitable for pigment use.

19. The method of producing a pigment-form of a pigmentary anthraquinone vat dyestuff, which comprises mixing the solid dyestuff with xylidine to secure a homogeneous mixture including said color and said xylidine, there being at least 1 part by weight of xylidine to 10 parts by weight of dyestuff, and then removing the xylidine from the mixture, whereby the physical form of the resulting solid is suitable for pigmentary use.

GRADY M. O'NEAL.